Dec. 20, 1938.    W. F. BIEDERMANN    2,140,491
CHAIN
Filed Nov. 4, 1936
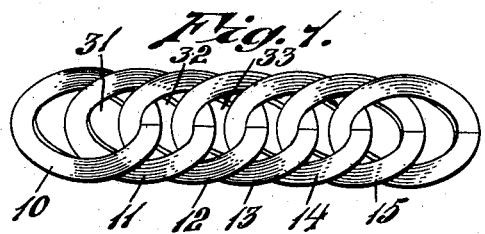
 
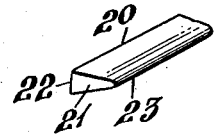 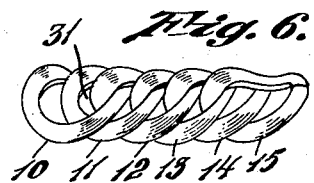
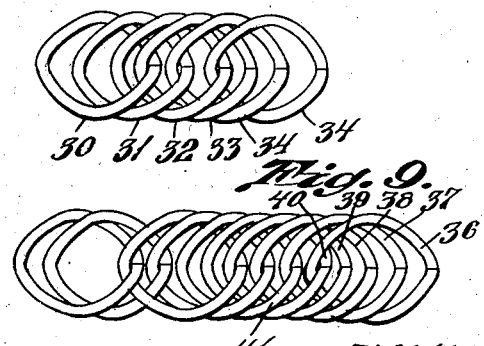 
INVENTOR.
William F. Biedermann
BY Barlow & Barlow
ATTORNEYS.

Patented Dec. 20, 1938

2,140,491

UNITED STATES PATENT OFFICE 2,140,491

CHAIN

William F. Biedermann, Providence, R. I., assignor to Federal Chain Company, a corporation of Rhode Island Application November 4, 1936, Serial No. 109,126

10 Claims. (Cl. 59—80)

This invention relates to a chain, such as may be used for jewelry purposes, as for necklaces or the adornment of dresses, or it may be used as a handle for handbags and various other uses where a flexible element is desired.

An object of this invention is the provision of a chain which will be flat and be closely compact and yet when one end is picked up the chain will fall into perfect alignment rather than being kinked and require manual manipulation for straightening.

Another object of the invention is the provision of a chain from wire having any desired cross-section such as a generally triangular cross-section which may be called "knife edge" wire and in which each link passes through two or more other links of the chain.

Another object of the invention is to provide a chain which is comparatively wide and yet extremely thin with smaller wire being used with the required strength being had.

Another object of the invention is the provision of a chain having each link passing through two other links in longitudinal series with the ends of each link abutting in desired alignment, although non-soldered.

With these and other objects in view, the invention consists of certain novel features of construction, as will be more fully described, and particularly pointed out in the appended claims.

In the accompanying drawing:

Fig. 1 is a top plan view of the chain;

Fig. 2 is an edge elevation thereof;

Fig. 3 is an edge view of a single link;

Fig. 4 is a sectional view taken through the center at right angles to the longitudinal axis of one of the links;

Fig. 5 is a fragmental view of the wire showing the shape thereof before being formed into a link;

Fig. 6 is a perspective view of the chain showing the same somewhat differently from that shown in Fig. 1;

Fig. 7 is a perspective view of a single link looking towards the end thereof;

Fig. 8 is a top plan view of a modified chain in which a link embraces three other links;

Fig. 9 is a view similar to Fig. 8 of a different modification in which a link embraces four links.

Chains of compact form when in a pile with the links one on top of the other, or bunched together usually cause the links to be so disarranged from the position which they assume in a longitudinal series that the chain does not lie flat when straightened out nor does it straighten out when one end is picked up and the same allowed to drop in a pendant relation; and in order that this undesirable effect may be substantially eliminated, I have provided a chain which is of compact relation by reason of each link passing through two or more previous links of the series and each link is curbed or twisted through substantially 90° so that the same will lie flat; and I may so shape the links in cross-section that the wire is substantially triangular such as may be sometimes termed a "knife edge" wire with one edge of the triangle facing outwardly, and by reason of this formation the links lie one over the other into correct position of alignment very readily and do not kink or cause a snarl in a general longitudinal direction of the chain; further, the chain may be made wide yet relatively thin, strong and compact; and the following is a more detailed description of the present embodiment of this invention, illustrating the preferred means by which these advantageous results may be accomplished:

With reference to the drawing, the links in the longitudinal series are designated 10, 11, 12, 13, 14 and 15. Each of these links is identical and is formed from a wire such as shown in fragmental perspective in Fig. 5. This wire, as will be apparent from the drawing, is generally the shape of an isosceles triangle as at 21, and the same is so bent that the base 22 of the triangle faces inwardly while the apex 23 thereof faces outwardly, as can readily be seen in Fig. 4.

The wire 20 is so bent that its end portions 24 and 25 abut as at 26, although these ends are not necessarily soldered and one of the features of this chain is that the structure is such that the ends do not need to be soldered in the structure thereof and may be machine made. Each of these links is also curbed or twisted which is accomplished by engaging the opposite ends thereof and relatively oppositely rotating the nipping members thereof through substantially 90° so that a link twisted, as shown in Figs. 2 and 3, is provided.

Each of the links is passed through two of the preceding links in the longitudinal series in Figs. 1 to 6, thus link 10 passes through the opening 31 of link 11 and the opening 32 of link 12; similarly, the link 11 passes through the opening 32 in the link 12 and the opening 33 in the link 13, etc., along the series.

Thus, there is provided a "double" curbed chain in which each link is twisted and passes through two other links, and by being twisted, each of the links will lie flat or in a position substantially as shown in Fig. 3, notwithstanding the connection to the next two links, and by reason of the triangular or "knife edge" shape of the link the arrangement is such that the links will not snarl when picked up or one become entangled with other adjoining or adjacent links.

In Fig. 8 each link, as 30, passes through three previously formed links, as 31, 32, 33, while in Fig. 9 each link, as 36, passes through four previously formed links, as 37, 38, 39 and 40. In both of these figures the cross-section of the wire of the link is round rather than triangular, although wire of any cross-section may be used. The greater the number of links each link passes through, the longer must be each link and consequently a chain formed of long links cannot be bent about an arc of as short a radius and closely fit thereto as links of shorter length. On the other hand where each link passes through a large number of links, although it may be made long, its wire may be of lesser size for the required strength and the spaces through the chain are smaller and of lesser size for the required strength and the spaces through the chain are smaller and of less area than where the wire is larger and the embraced links are fewer. An important factor, however, is that in the chains such as in Figs. 8 and 9 when the chain is laid flat it is thinner than a chain, as shown in Fig. 6, which in many cases is a decided advantage. Thus, I have found with these governing factors chains to suit different conditions may be formed.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A chain comprising a plurality of links having a central opening, each link being curbed and passing through the opening of more than two of the other links in the longitudinal series with the ends of the links meeting and being in substantial alignment and non-soldered, the cross-section of the stock of the links being other than round and of a shape to assist in causing the links to lie flat.

2. A chain comprising a plurality of links having a central opening, each link being curbed and passing through the opening of three of the other links in the longitudinal series, the stock of the links having substantially greater breadth than thickness.

3. A chain comprising a plurality of links having a central opening, each link being curbed and passing through the opening of four of the other links in the longitudinal series, the stock of the links having substantially greater breadth than thickness.

4. A chain comprising a plurality of links having a central opening, each link being curbed and passing through the opening of two of the other links in the longitudinal series, the cross-section of the stock of the links being other than round and of a shape to assist in causing the links to lie flat.

5. A chain comprising a plurality of links having a central opening, each link being curbed and passing through the opening of two of the other links in the longitudinal series, the cross-section of the stock of the links being generally triangular and having substantially greater breadth than thickness.

6. A chain comprising a plurality of links having a central opening, each link being curbed and passing through the opening of two of the other links in the longitudinal series, the cross-section of the stock of the links being triangular with the apex of the triangle positioned outwardly reltaive to the center of the links.

7. A chain comprising a plurality of links having a central opening, each link being curbed and passing through the openings of two of the other links in the longitudinal series, the cross-section of the stock of the links being generally the shape of an isosceles triangle.

8. A chain comprising a plurality of mechanically produced identical links having a central opening, each link being curbed and passing through the openings of two of the other links in the longitudinal series, the cross-section of the stock of the links being generally the shape of on isosceles triangle with the apex thereof positioned to form the outer edge of the link having the angle included between the equal legs substantially less than 90°.

9. A chain comprising a plurality of mechanically produced identical links having a central opening, each link being curbed by being twisted through substantially 90° and passing through the openings of two of the other links in the longitudinal series, the cross-section of the stock of the links being other than round and of a shape to assist in causing the links to lie flat.

10. A chain comprising a plurality of links having a central opening, each link being curbed by being twisted through substantially 90° and passing through the openings of two of the other links in the longitudinal series, the cross-section of the stock of the links being triangular with the apex of the triangle positioned to form the outer edge of the link and the base thereof positioned to form the inner edge of the link.

WILLIAM F. BIEDERMANN.